United States Patent
Emori

(10) Patent No.: US 10,262,249 B2
(45) Date of Patent: Apr. 16, 2019

(54) CONTACTLESS INFORMATION MEDIUM AND MANUFACTURING METHOD THEREOF

(71) Applicant: Universal Entertainment Corporation, Tokyo (JP)

(72) Inventor: Kazuki Emori, Tokyo (JP)

(73) Assignee: UNIVERSAL ENTERTAINMENT CORPORATION, Tokyo (JP)

( * ) Notice: Subject to any disclaimer, the term of this patent is extended or adjusted under 35 U.S.C. 154(b) by 0 days.

(21) Appl. No.: 16/018,472

(22) Filed: Jun. 26, 2018

(65) Prior Publication Data

US 2019/0005366 A1    Jan. 3, 2019

(30) Foreign Application Priority Data

Jun. 28, 2017  (JP) ................. 2017-126458

(51) Int. Cl.
| | | |
|---|---|---|
| *G06K 19/04* | (2006.01) | |
| *G06K 19/077* | (2006.01) | |
| *G07F 17/32* | (2006.01) | |

(52) U.S. Cl.
CPC ..... *G06K 19/047* (2013.01); *G06K 19/07781* (2013.01); *G06K 19/07796* (2013.01); *G07F 17/32* (2013.01)

(58) Field of Classification Search
CPC ........... G06K 19/047; G06K 19/07781; G06K 19/07796; G07F 17/32

USPC ........................................................ 235/492
See application file for complete search history.

(56) References Cited

U.S. PATENT DOCUMENTS

| | | | | |
|---|---|---|---|---|
| 6,124,779 A * | 9/2000 | Yamamoto | .......... | H01F 17/0013 29/604 |
| 6,820,320 B2 * | 11/2004 | Anbo | .................. | H01F 17/0013 29/602.1 |
| 9,640,313 B2 * | 5/2017 | Yazaki | ................ | H01F 17/0013 |
| 9,899,149 B2 * | 2/2018 | Lee | ..................... | H01F 27/2828 |
| 10,096,427 B2 * | 10/2018 | Yoneda | ............... | H01F 27/2804 |
| 10,102,961 B2 * | 10/2018 | Kim | ..................... | H01F 27/2804 |
| 2012/0223148 A1 * | 9/2012 | Kato | ..................... | G06K 19/041 235/492 |

* cited by examiner

*Primary Examiner* — Seung H Lee
(74) *Attorney, Agent, or Firm* — Lex IP Meister, PLLC

(57) ABSTRACT

Provided is a contactless information medium that achieves reduction in initial failure at the time of manufacture and obtains stable quality. A contactless information medium 1 includes a plurality of substrates 2a to 2d in a stacked state, an electric conductor 4, and an IC chip 5. The electric conductor 4 is integrally provided on each of the substrates 2a to 2d, and has a pre-formed conductive pattern 3. The IC chip 5 is mounted on any one of the substrates 2a to 2d, and is connected to the electric conductor 4. The conductive pattern 3 partially includes spiral patterns 31a to 31d formed in a spiral shape. The spiral patterns 31a to 31d are arranged at different positions among the substrates 2a to 2d.

5 Claims, 4 Drawing Sheets

CONTACTLESS INFORMATION MEDIUM AND MANUFACTURING METHOD THEREOF

CROSS-REFERENCE TO RELATED APPLICATION

This application claims priority from Japanese Patent Application No. 2017-126458, filed on Jun. 28, 2017, which application is incorporated herein by reference in its entirety.

FIELD OF THE INVENTION

The present invention relates to a contactless information medium and a method of manufacturing the contactless information medium.

BACKGROUND OF THE INVENTION

Recently, a contactless information medium including an IC chip and an antenna has been widely used in various fields, such as distribution, traffic, finance, entertainment, and amusement. For example, a currently-used contactless information medium includes a body, an IC chip, and a coil antenna. The body forms a profile of the contactless information medium. The IC chip is housed in the body. The coil antenna is formed of a string of conductive wire, both ends of the conductive wire being connected to the IC chip. The coil antenna includes a main arrangement pattern provided along a closed curve and a plurality of sub-arrangement patterns each having a smaller diameter than the main arrangement pattern. The contactless information medium further includes a plurality of bobbins provided in the body and arranged along the closed curve. The string of conductive wire is wound around the plurality of bobbins along the closed curve to form the main arrangement pattern, and the string of conductive wire is wound around each of the bobbins to form the sub-arrangement patterns. See, International Publication No. WO2013/099546. This enables communication between each of a plurality of contactless information media and a communication device while the contactless information media are stacked.

BRIEF SUMMARY OF THE INVENTION

In the currently-used contactless information medium described above, a coil winder is used to wind a coil around the bobbins. In such a winding process, poor or defective winding of the coil may occur, leading to unstable quality of finished products.

In view of the above, one object of the present invention is to provide a contactless information medium and a method of manufacturing the contactless information medium that achieves reduction in initial failure at the time of manufacture and obtains stable quality.

One aspect of the present invention is a contactless information medium. The contactless information medium includes a plurality of substrates in a stacked state, an electric conductor, and an IC chip. The electric conductor is integrally provided on each of the substrates, and has a pre-formed conductive pattern. The IC chip is mounted on any one of the substrates, and is connected to the electric conductor. The conductive pattern partially includes spiral patterns formed in a spiral shape. The spiral patterns are arranged at different positions among the substrates.

With the above-described structure, the electric conductor includes the pre-formed spiral patterns, and is integrally provided on the substrates. This enables omission of a process for winding a coil. Consequently, stable quality is retainable at the time of manufacture.

Another aspect of the present invention is a contactless information medium. The contactless information medium includes a plurality of substrates in a stacked state, an electric conductor integrally provided on each of the substrates, and having a pre-formed conductive pattern, and an IC chip mounted on uppermost one of the substrates in a stacking direction. The conductive pattern includes spiral patterns each formed in a spiral shape from an outer circumferential end to an inner circumferential end thereof, and conductive connection patterns each connected to the outer circumferential end of each of the spiral patterns. The substrates each include a conductive hole for providing electrical conductivity between the inner circumferential end of each of the spiral patterns and another substrate on a different layer. The spiral patterns are arranged at different positions among the substrates seen in the stacking direction. The conductive connection patterns each provides electrical conductivity between the conductive hole and the outer circumferential end of the spiral patterns.

With the above-described structure, the electric conductor includes the pre-formed spiral patterns and the pre-formed conductive connection patterns, and is provided on the substrates integrally. This enables omission of a process for winding a coil. Consequently, stable quality is retainable at the time of manufacture.

The contactless information medium of the present invention may include a housing. The housing accommodates the substrates therein, and forms a profile of the contactless information medium.

With the above-described structure, the housing protects the electric conductor, the IC chip, and the substrates. This achieves long-time maintenance of quality.

The housing of the present invention is formed by sealing the substrates with resin while the IC chip contains a memory area in which value data of a casino chip is stored in such a manner as to be transmittable to an external server. The housing has a design indicating the value data, and the design enables distinction of the contactless information medium from another contactless information medium that stores different value data. Such a structure is applicable.

With the above-described structure, the casino chip is obtainable whose value data is distinguishable by the design of the housing.

Another aspect of the present invention is a method of manufacturing a contactless information medium. The method includes a printing step; an electrically connecting step; and a mounting step of mounting the IC chip. The printing step is performed by printing, to an elongated flexible printed board, the conductive patterns with the spiral patterns in such a layout as for the spiral patterns not to overlap one another vertically when the substrates are connected successively via folding parts, and are folded at the folding parts to constitute the stacked state. The electrically connecting step is performed by bending the flexible printed board at the folding parts to make the contactless information medium having the substrates in the stacked state and electrically connecting each layer of the substrates in the stacked state.

With the above-described structure, the substrates are folded at the folding parts. Consequently, the contactless information medium with the stacked substrates is easily manufacturable.

The present invention enables provision of the contactless information medium that achieves reduction in initial failure at the time of manufacture and obtains stable quality.

DETAILED DESCRIPTION OF THE PREFERRED EMBODIMENT

The following describes a contactless information medium of the present invention with reference to the drawings.

Contactless Information Medium 1: Substrate Laminate 11

Figure 1:
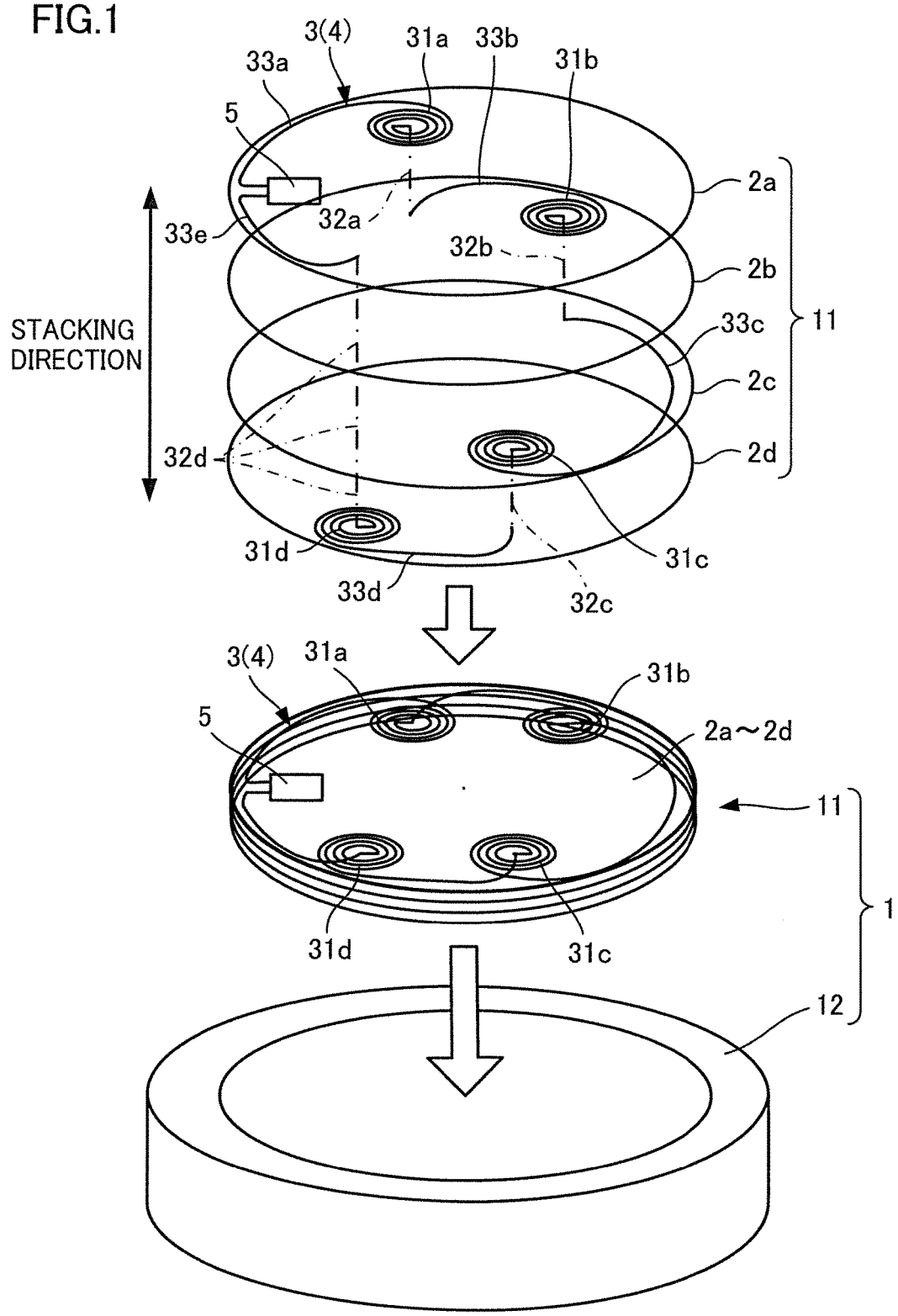
FIG. 1 illustrates an exploded view of a contactless information medium and a substrate laminate.
Figure 2:
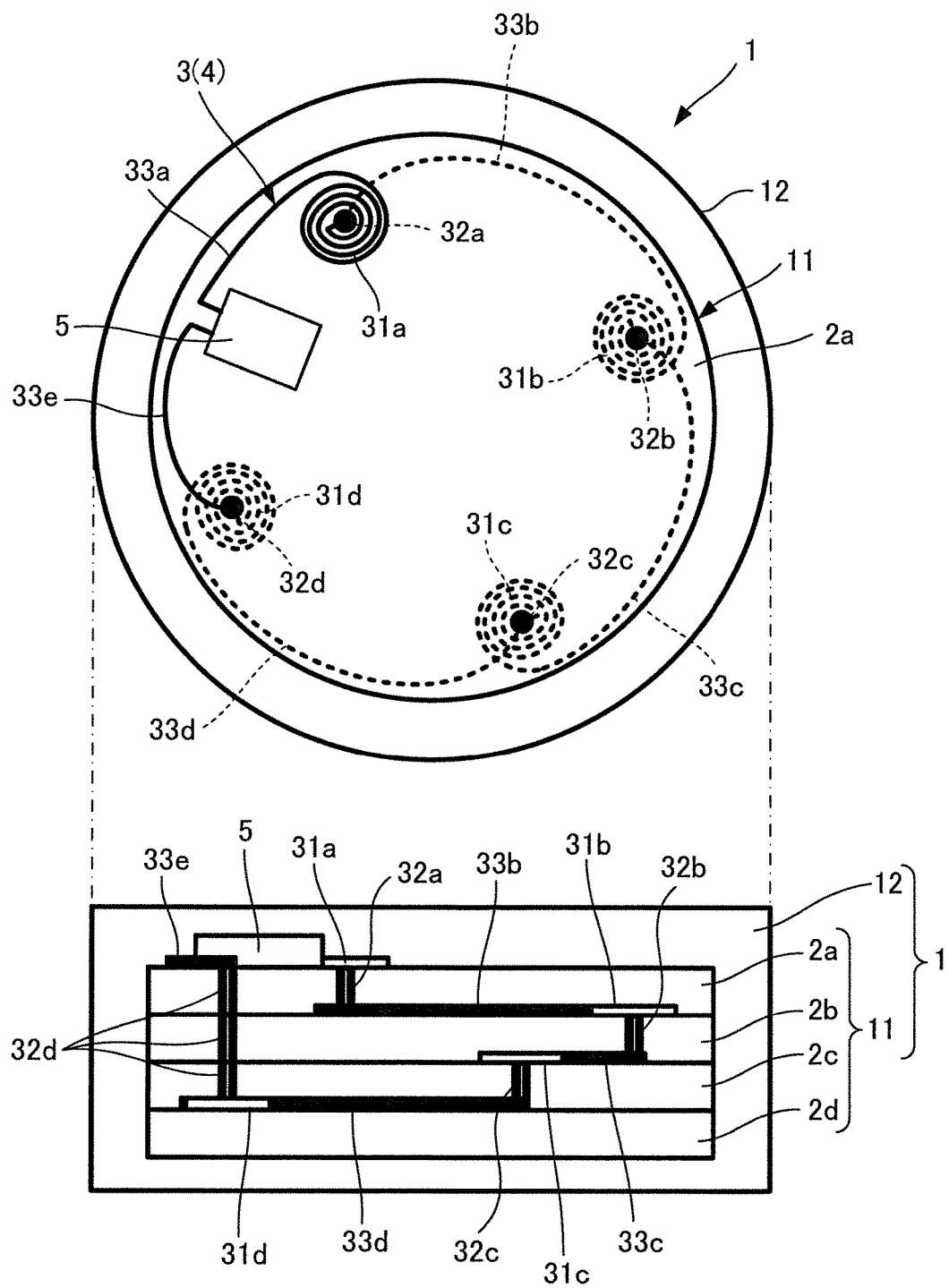
FIG. 2 illustrates the contactless information medium having a top view and a side view thereof with a connection line.

As shown in FIGS. 1 and 2, a contactless information medium 1 includes a substrate laminate 11 and a housing 12. The housing 12 accommodates the substrate laminate 11 therein, and forms a profile the contactless information medium 1.

The substrate laminate 11 includes a plurality of substrates 2a to 2d in a stacked state, an electric conductor 4, and an IC chip 5. The electric conductor 4 is integrally provided on each of the substrates 2a to 2d, and has a pre-formed conductive pattern 3. The IC chip 5 is mounted on any one of the substrates 2a to 2d, and is connected to the electric conductor 4. It should be noted that, while the present embodiment is described using a four-layered substrate laminate 11 having the four substrates 2a to 2d being stacked, the disclosure is not limited to this arrangement.

The conductive pattern 3 partially includes spiral patterns 31a to 31d formed in a spiral shape. The spiral patterns 31a to 31d are arranged at different positions among the substrates 2a to 2d. With this, the electric conductor 4 forming the conductive pattern 3 with the spiral patterns 31a to 31d is integrally provided on the substrates 2a to 2d. This enables omission of a process for winding a coil. Consequently, stable quality of the contactless information medium 1 is retainable at the time of manufacture.

To be more specific, the substrate laminate 11 includes a plurality of, e.g., four disk substrates 2a to 2d in the stacked state, the electric conductor 4, and the IC chip 5. The electric conductor 4 is integrally provided on each of the substrates 2a to 2d, and has a pre-formed conductive pattern 3. The IC chip 5 is mounted on a substrate 2a at the uppermost position in the stacking direction. The IC chip 5 is a general electronic module, and a function thereof is not particularly limited. The IC chip 5 may include a storage unit. The storage unit enables storage of various kinds of data, such as individual information (ID), face value, an owner, and a circulation history, on the contactless information medium 1. In other words, the IC chip 5 contains a storage unit (memory area) in which various kinds of data, such as value data of a casino chip, are stored in such a manner as to be transmittable to an external server.

Contactless Information Medium 1: Substrate Laminate 11: Spiral Patterns 31a to 31d The conductive pattern 3 includes the spiral patterns 31a to 31d. The spiral patterns 31a to 31d each have a portion in a spiral shape from its outer circumferential end to its inner circumferential end. The spiral patterns 31a to 31d are formed on the substrates 2a to 2d, respectively. Specifically, the substrate 2a on the uppermost first layer has a first spiral pattern 31a formed thereon with the IC chip 5. A substrate 2b on a second layer has a second spiral pattern 31b formed thereon. A substrate 2c on a third layer has a third spiral pattern 31c formed thereon. A substrate 2d on the lowermost fourth layer has a fourth spiral pattern 31d formed thereon.

The first to fourth spiral patterns 31a to 31d are arranged at different positions seen in the stacking direction. It is preferred that the term "different positions seen in the stacking direction" means that none of the first to fourth spiral patterns 31a to 31d overlaps one another in the stacking direction. The first to fourth spiral patterns 31a to 31d may be arranged at an equal pitch, or may be arranged at different pitches.

The substrates 2a to 2c on the first to third layers further have conductive holes 32a to 32c, respectively. The conductive holes 32a to 32c provides electrical conductivity between the inner circumferential ends of the spiral patterns 31a to 31c and the substrates 2b to 2d, respectively, on the different layers. The substrates 2a to 2c on the first to third layers further have a conductive hole 32d. The conductive hole 32d provides electrical conductivity between the inner circumferential end of the fourth spiral pattern 31d on the substrate 2d on the fourth layer and the substrate 2a on the first (uppermost) layer.

Contactless Information Medium 1: Substrate Laminate 11: Conductive Connection Patterns 33a to 33e The conductive pattern 3 further includes first to fifth conductive connection patterns 33a to 33e in addition to the first to fourth spiral patterns 31a to 31d. The first conductive connection pattern 33a and the fifth conductive connection pattern 33e are arranged on the substrate 2a on the first layer. The first conductive connection pattern 33a provides electrical conductivity between a first terminal of the IC chip 5 and the outer circumferential end of the first spiral pattern 31a. The fifth conductive connection pattern 33e provides electrical conductivity between the conductive hole 32d of the fourth spiral pattern 31d and a second terminal of the IC chip 5.

Moreover, the second conductive connection pattern 33b is arranged on the substrate 2b on the second layer. The second conductive connection pattern 33b provides electrical conductivity between the conductive hole 32a of the first spiral pattern 31a and the conductive hole 32b of the second spiral pattern 31b. The third conductive connection pattern 33c is arranged on the substrate 2c on the third layer. The third conductive connection pattern 33c provides electrical conductivity between the conductive hole 32b of the second spiral pattern 31b and the outer circumferential end of the third spiral pattern 31c. The fourth conductive connection pattern 33d is arranged on the substrate 2d on the fourth layer. The fourth conductive connection pattern 33d provides electrical conductivity between the conductive hole 32c of the third spiral pattern 31c and the outer circumferential end of the fourth spiral pattern 31d.

With this, the substrate laminate 11 is formable by the following processes: an arranging process of arranging the spiral patterns 31a to 31d, the conductive holes 32a to 32d, and the conductive connection patterns 33a to 33e individually on the substrates 2a to 2d; a stacking process of stacking the substrates 2a to 2d; a mounting process of mounting the IC chip 5 on the uppermost substrate 2a; and a heating and melting process of heating and melting solders of the substrate 2a to 2d. The substrate laminate 11 are electrically connected to the substrates 2a to 2d in the stacked state. Consequently, the substrate laminate 11 is provided with a loop antenna having a successive conductive path, formed by the spiral patterns 31a to 31d, the conductive holes 32a to 32d, and the conductive connection patterns 33a to 33e, and having the main arrangement pattern and the sub-arrangement patterns.

Operation of Substrate Laminate 11

The spiral patterns 31a to 31d and the conductive connection patterns 33a to 33e generally constitute the main arrangement pattern. The main arrangement pattern forms a circular closed curve having a diameter along peripheries of the substrates 2a to 2d. With this, in the case where the spiral patterns 31a to 31d are the sub-arrangement patterns, the sub-arrangement patterns formed by the spiral patterns 31a to 31d each have a diameter smaller than that of the main arrangement pattern. Consequently, the substrate laminate 11 has a built-in loop antenna. The loop antenna includes the main arrangement pattern and the spiral patterns 31a to 31d (sub-arrangement patterns). The main arrangement pattern forms the closed curve. The spiral patterns 31a to 31d are arranged along the closed curve, and each have a diameter smaller than that of the closed curve.

In the contactless information medium 1 with such a structure, electromagnetic mutual interference is small. Therefore, even when a plurality of contactless information media 1 is in the stacked state, communication is performable between each of the contactless information media 1 and a communication device not shown. Consequently, even when a plurality of (for example, ten or more) contactless information media 1 is piled up or heaped up in a packed state, each of the contactless information media 1 enables communication with the communication device not shown. Thus, various kinds of data, such as individual information (ID), on each of the contactless information media 1, are able to be monitored and recorded. In addition, it becomes possible to perform a value check and an authenticity determination of each of the contactless information media 1 in the packed state, to detect the position and the number of the contactless information media 1, and to calculate the total value thereof. As a result, the contactless information medium 1 is suitably usable for applications such as a coin (chip) used for various games like a card game and a board game, a token used in a transportation facility, and a medal used for a kid-friendly game.

Also, in the present embodiment, the main arrangement pattern of the loop antenna is the circular closed curve. However, the main arrangement pattern is not limited to the circular shape as long as the sub-arrangement patterns are able to be arranged along the closed curve. For example, the main arrangement pattern may be a closed curve with an oval shape, a polygonal shape such as a square shape, a pentagonal shape, or a hexagonal shape, or a star-like shape.

In this case, the arrangements and the shapes of the spiral patterns 31a to 31d are variable depending on the pattern of the loop antenna.

Contactless Information Medium 1: Housing 12

The housing 12 is formed by sealing the substrates 2a to 2d with resin. The housing has a design indicating the value data, and the design enables distinction of the contactless information medium 1 from another contactless information medium 1 that stores different value data. With this, the casino chip is obtainable whose value data is distinguishable by the design of the housing 12.

To be more specific, the housing 12 is able to accommodate the substrate laminate 11. The housing 12 is formed in a circular coin shape. Also, various shapes of the housing 12 may be selected as long as the housing 12 is able to accommodate the substrate laminate 11. Examples of the shape include an oval shape, a polygonal shape such as a square shape, a pentagonal shape, and a hexagonal shape, and a star-like shape in which a plurality of regions on the circumference of a circle projects toward the outer periphery. Moreover, the housing 12 includes on its surface a pattern, a number, a color, and the like, formed thereon that indicates the value data.

The housing 12 is formed, by an injection molding method, from a material in which powder of glass or non-magnetic (or feebly magnetic) metal or alloy is blended into a rigid resin material, such as nylon and acrylonitrile butadiene styrene (ABS) copolymer. Thus, the contactless information medium 1 is able to with a simple structure, without interfering with the communication by the loop antenna.

Moreover, the housing 12 may be a metal member arranged inside a peripheral part thereof adjacent to the outer periphery of the substrate laminate 11. A material of the metal member is selected from various kinds of metal or alloy, such as copper, aluminum, or brass, depending on the weight required for the contactless information medium 1. In this structure, the metal member is arranged on the peripheral part of the housing 12. Thus, the contactless information medium 1 is able to be weighted with a simple structure, without interfering with the communication by the loop antenna of the substrate laminate 11. As for the structure and the manufacturing method of the housing 12, the structure and the manufacturing method described in International Publication No. WO2013/099546 is applicable.

Modification

It should be noted that, while the contactless information medium 1 in the present embodiment is described using the four-layered substrate laminate 11 with the spiral patterns 31a to 31d formed on the substrates 2a to 2d, respectively, the disclosure is not limited to this arrangement. That is, the substrate laminate 11 may include a loop antenna having the conductive path formed by the conductive pattern 3, and also having the main arrangement pattern and the sub-arrangement pattern.

Figure 3:
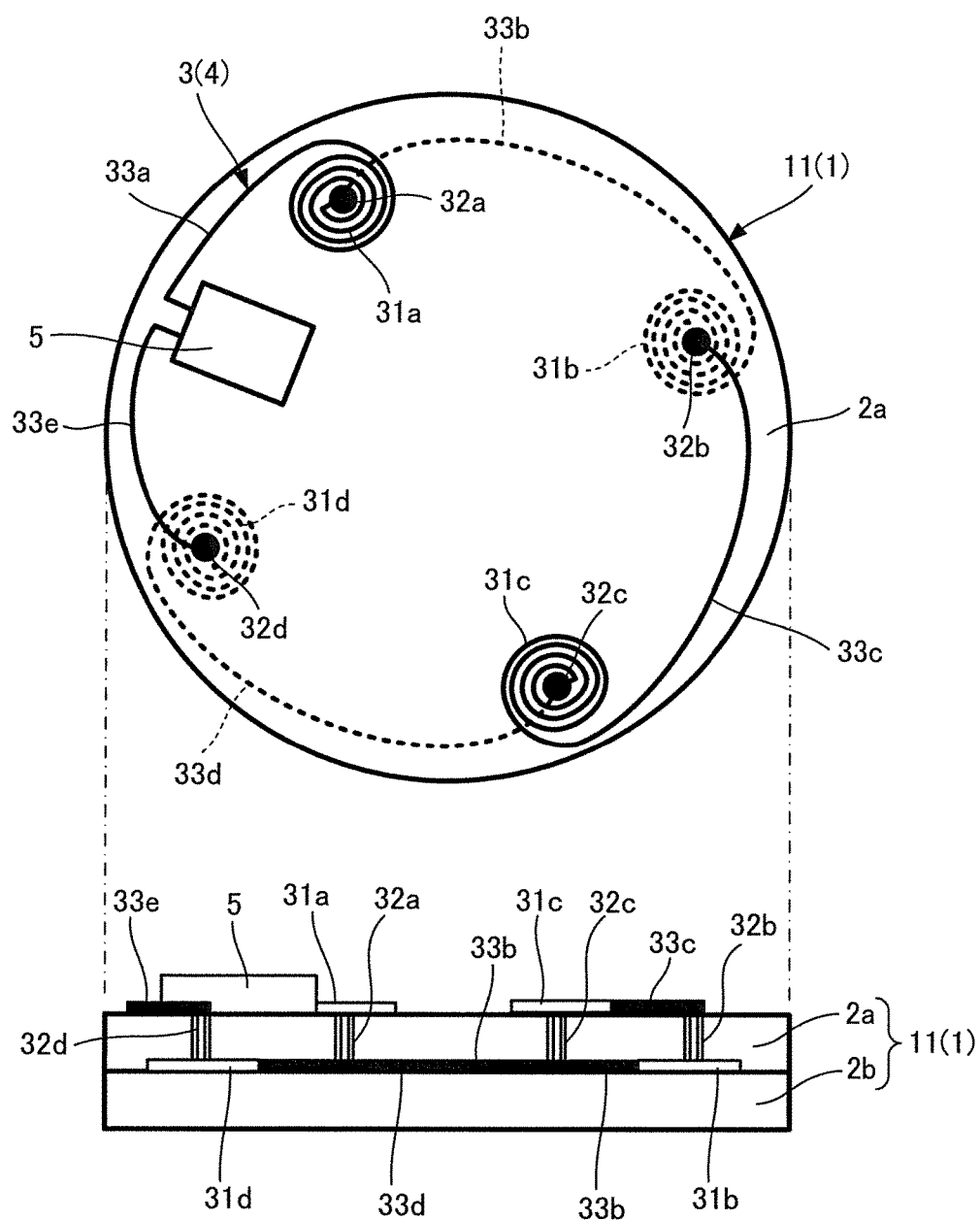
FIG. 3 illustrates a substrate laminate with a top view and a side view thereof with a connection line.

For example, as shown in FIG. 3, the substrate laminate 11 may have the first spiral pattern 31a and the third spiral pattern 31c arranged on the substrate 2a on the first layer, and the second spiral pattern 31b and the fourth spiral pattern 31d arranged on the substrate 2b on the second layer. In this case, a two-layered substrate laminate 11 is obtainable by arranging the first conductive connection pattern 33a, the fifth conductive connection pattern 33e, and the third conductive connection pattern 33c on the substrate 2a on the first layer, and arranging the second conductive connection pattern 33b and the fourth conductive connection pattern 33d on the substrate 2b on the second layer.

Moreover, the substrate laminate 11 may have overlapping region patterns of the conductive path that traverse the first to fourth spiral patterns 31a to 31d. The overlapping region patterns are arranged on the substrates 2a to 2d, which are each different from the substrates 2a to 2d where the first to fourth spiral patterns 31a to 31d to be traversed are arranged.

Contactless Information Medium 1: Manufacturing Method

The contactless information medium 1 may be manufactured by forming the substrates 2a to 2d in a matrix array on the elongated flexible printed board, cutting the substrates 2a to 2d individually, and thereafter stacking the substrates 2a to 2d. However, the disclosure is not limited to this arrangement.

Figure 4:
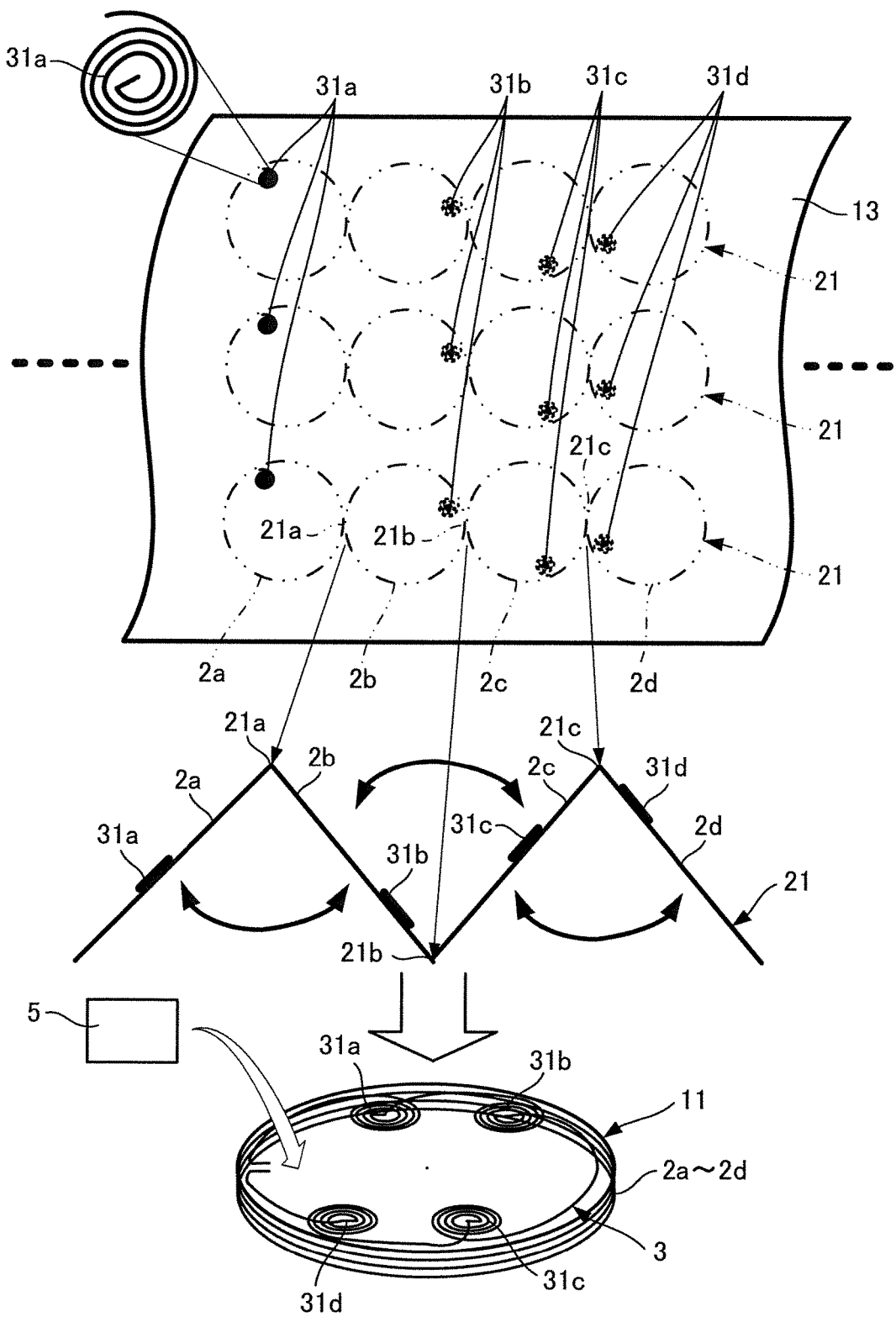
FIG. 4 illustrates a method of manufacturing the contactless information medium.

For example, as shown in FIG. 4, the contactless information medium 1 may be manufactured in such a method as under. That is, the method includes disposing a plurality of connected boards 21, formed by connecting a plurality of substrates 2a to 2d via folding parts 21a, 21b, and 21c, on the flexible printed board 13, and stacking the substrates 2a to 2d on each of the connected boards 21.

Specifically, the contactless information medium 1 may be manufactured in such a method as under. That is, the method includes a printing step; an electrically connecting step; and a mounting step of mounting the IC chip 5. The printing step is performed by printing, to the elongated flexible printed board 13, a conductive pattern 3 with spiral patterns 31a to 31d in such a layout as for the spiral patterns 31a to 31d not to overlap one another vertically when the substrates 2a to 2d are connected successively via folding parts 21a, 21b, and 21c, and are folded at the folding parts 21a, 21b, and 21c to constitute the stacked state. The electrically connecting step is performed by bending the flexible printed board 13 at the folding parts 21a, 21b, and 21c to make the contactless information medium 1 (substrate laminate 11) having the substrates 2a to 2d in the stacked state, and electrically connecting layers of the substrates 2a to 2d in the stacked state.

With the above-described structure, the substrates 2a to 2d are folded at the folding parts 21a, 21b, and 21c. Consequently, the contactless information medium 1 with the stacked substrates 2a to 2d are easily manufacturable. Specifically, the spiral patterns 31a to 31d are formed as coils on each layer of the substrates to be stacked. When the spiral patterns 31a to 31d overlap vertically, such a problem may arise that interference of signals occurs to cause unstable frequency. In contrast to this, with the above-described structure, the spiral patterns 31a to 31d are preformed on the flexible printed board 13 so as not to overlap when the substrates are stacked. Consequently, merely folding the substrates via the folding parts 21a, 21b, and 21c enables prevention of vertical overlap of the spiral patterns 31a to 31d. Especially when the contactless information medium 1 is manufactured to be smaller in size, a manufacturing method with higher accuracy is required so as for the spiral patterns 31a to 31d not to overlap vertically. This structure described above avoids such a problem that alignment of the spiral patterns becomes particularly difficult depending on sizes of the contactless information medium.

Embodiments of the present invention thus described above solely serve as specific examples of the present invention, and are not to limit the scope of the present invention. The specific structures of the devices and the like are suitably modifiable. Further, the effects described in the embodiments of the present invention are no more than examples of preferable effects brought about by the present invention, and the effects of the present invention are not limited to those described hereinabove.

What is claimed is:

1. A contactless information medium, comprising: a plurality of substrates in a stacked state; an electric conductor integrally provided on each of the substrates, and having a pre-formed conductive pattern; and an IC chip mounted on any one of the substrates, and connected to the electric conductor,
   the conductive pattern partially including spiral patterns formed in a spiral shape, and the spiral patterns being arranged at different positions among the substrates.

2. The contactless information medium according to claim 1, further comprising a housing that accommodates the substrates therein, and forms a profile of the contactless information medium.

3. The contactless information medium according to claim 2, wherein the housing is formed by sealing the substrates with resin while the IC chip contains a memory area in which value data of a casino chip is stored in such a manner as to be transmittable to an external server, and
   the housing has a design indicating the value data, and the design enables distinction of the contactless information medium from another contactless information medium that stores different value data.

4. A contactless information medium, comprising: a plurality of substrates in a stacked state; an electric conductor integrally provided on each of the substrates, and having a pre-formed conductive pattern; and
   an IC chip mounted on uppermost one of the substrates in a stacking direction,
   the conductive pattern including spiral patterns each formed in a spiral shape from an outer circumferential end to an inner circumferential end thereof, and conductive connection patterns each connected to the outer circumferential end of each of the spiral patterns,
   the substrates each including a conductive hole for providing electrical conductivity between the inner circumferential end of each of the spiral patterns and another substrate on a different layer, the spiral patterns being arranged at different positions among the substrates seen in the stacking direction, and
   the conductive connection patterns each providing electrical conductivity between the conductive hole and the outer circumferential end of each of the spiral patterns.

5. A method of manufacturing the contactless information medium according to claim 1, the method comprising:
   a printing step of printing, to an elongated flexible printed board, the conductive patterns with the spiral patterns in such a layout as for the spiral patterns not to overlap one another vertically when the substrates are connected successively via folding parts, and are folded at the folding parts to constitute the stacked state;
   an electrically connecting step of bending the flexible printed board at the folding parts to make the contactless information medium having the substrates in the stacked state and electrically connecting each layer of the substrates in the stacked state; and
   a mounting step of mounting the IC chip.

* * * * *